Aug. 30, 1966  R. E. POIRIER  3,269,759
GREASELESS BALL JOINT
Original Filed March 3, 1961
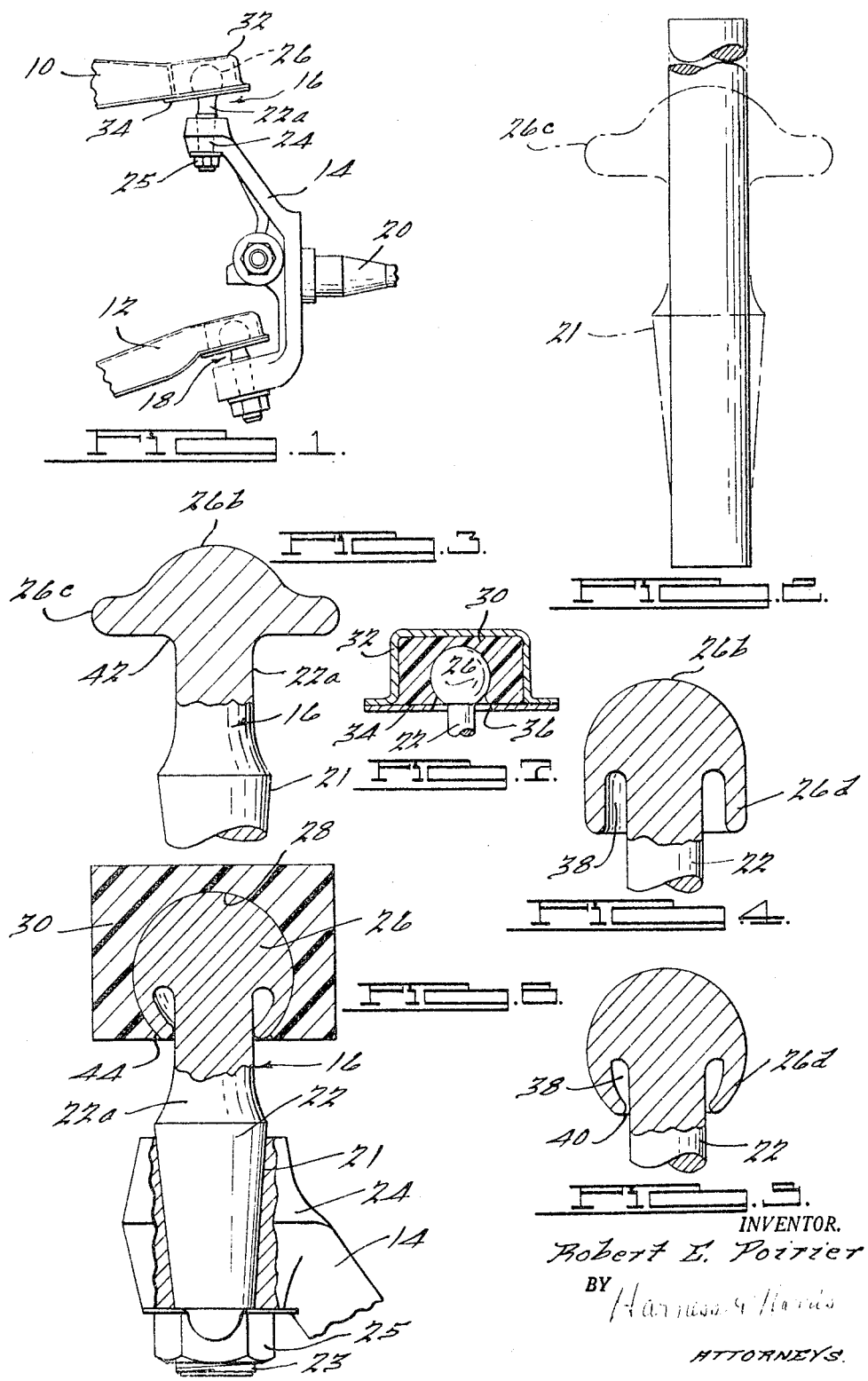
INVENTOR.
Robert E. Poirier
BY Harness & Harness
ATTORNEYS.

United States Patent Office 3,269,759
Patented August 30, 1966

3,269,759
GREASELESS BALL JOINT
Robert E. Poirier, Ferndale, Mich., assignor to Chrysler Corporation, Highland Park, Mich., a corporation of Delaware
Original application Mar. 3, 1961, Ser. No. 93,118, now Patent No. 3,126,612, dated Mar. 31, 1964. Divided and this application June 7, 1963, Ser. No. 286,281
3 Claims. (Cl. 287—87)

This invention relates to improvements in a universal coupling and method of making the same, as for example the compression-type coupling in a vehicle wheel suspension comprising a shaft having a ball head pivotally seated in a greaseless plastic socket. This application is a division of my copending application Serial No. 93,118, filed March 3, 1961, and now Patent No. 3,126,612.

In such a construction the outer surface of the ball head or end serves as a load sustaining thrust bearing and must comprise a smooth spherical bearing surface to prevent destruction of the comparatively soft plastic material of the mating ball receiving socket. Heretofore such ball ends have been formed oversize by various forging or casting methods, then ground to the desired spherical bearing surface. Such a procedure is costly and has accordingly not been considered to be commercially feasible in the highly competitive and cost conscious automobile manufacturing industry.

An important object of the present invention is to provide an improved ball and socket type universal coupling and method of fabricating the same which are simple, efficient, and economical, the coupling being particularly suitable for use in the thrust or compression type vehicle wheel suspension, or at the vehicle steering gear tie rod ends, by way of example.

In the usual formation of a ball head shaft by conventional forging methods, a rough forging seam results at the outer end surface of the ball head. This seam must be ground to a smooth spherical finish before the ball head can be used efficiently as a thrust bearing. Also in accordance with conventional forging practice, a reversely curved portion of the shaft results where the base of the ball head joins the shaft stem. Such a formation limits the pivotal movement of the ball head in its socket and must be ground away to obtain optimum effectiveness of the coupling.

Other objects are accordingly to provide an improved ball head shaft for use in a universal coupling wherein the ball head is readily and economically manufactured by cold forging operations that avoid the formation of a forging seam on the bearing surface of the ball head, as well as the formation of the reversely curved portion at the base of the ball head. Thus the operations of removing such a seam and reversely curved portion are eliminated and economies are effected.

Still another object is to provide an improved ball head shaft and method of making the same wherein a portion of the shaft spaced from the ball head is forged to an enlarged diameter, thereby to provide an enlarged body for securing the shaft to a suitable support and to provide a reduced diameter neck for the shaft adjacent the ball head. In effect an undercut ball head is provided on a shaft body without the necessity of cutting away any portion of the shaft to form the reduced neck. In consequence, the reduced neck, which is desired to enhance the pivotal adjustability of the coupling, is simply and economically achieved.

Other objects of this invention will appear in the following description and appended claims, reference being had to the accompanying drawings forming a part of this specification wherein like reference characters designate corresponding parts in the several veiws.

FIGURE 1 is a fragmentary schematic elevational view of a vehicle wheel suspension embodying the present invention.

FIGURE 2 is an enlarged fragmentary elevational view of a rod to be forged into a ball head coupling in accordance with the present invention.

FIGURE 3 is a fragmentary mid-sectional view of the rod of FIGURE 2, showing an early stage in the formation of the coupling.

FIGURE 4 is a view similar to FIGURE 3, showing a more advanced stage in the formation of the coupling.

FIGURE 5 is a view similar to FIGURES 3 and 4, showing the completed ball head shaft.

FIGURE 6 is a view similar to FIGURE 5, showing the ball head confined within a mating plastic socket member.

FIGURE 7 is a reduced view similar to FIGURE 6, showing the socket member assembled within a retainer portion of the suspension.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, an embodiment of the present invention is illustrated by way of example in an automobile wheel suspension comprising upper and lower swinging control arms 10 and 12 connected with the upper and lower ends of a spindle support 14 by means of ball and socket type universal couplings 16 and 18 respectively. The support 14 carries a steering knuckle 20 on which a wheel is journalled in a customary manner. The couplings 16 and 18 are similar, so that only one is described in detail herein.

The upper coupling 16 for example comprises a cylindrical shaft 22 having an integral coaxial enlarged conically tapered body 21 which terminates in a threaded lower end 23. The body 21 is seated in a mating tapered socket in an upper bracket 24 of support 14 and is suitably secured thereto by a nut 25 screwed on end 23 which projects below bracket 24. An integral neck 22a of shaft 22 extends coaxially upwardly from the enlarged body 21 and terminates in an integral enlarged spherical ball head 26 confined within a mating spherical socket 28 in a plastic bearing member 30. The latter in turn is confined within a hollow retainer 32 comprising a downwardly opening cup at the free or swinging end of arm 10, such that the top and sides of plastic member 30 are closely confined within cup 32. A plate 34 having a conical aperture 36 for passage of the neck of shaft 22 is suitably secured as for example by welding to the underside of arm 10 to substantially close the opening of retainer cup 32, FIGURE 7.

In the construction shown, the shaft 22 is under compression and the ball head 26 comprises a thrust bearing which sustains in part the weight of the automobile. The control arms 10 and 12 are pivotally mounted on the vehicle chassis in accordance with conventional practice, so that the mating spherical bearing surfaces of the socket 28 and ball head 26 are in constant universal pivotal movement with respect to each other when subject to road bounce and vehicle steering. The plastic member 30 preferably comprises a smooth resilient bearing material such as nylon or Teflon which when suitably confined as in the retainer 32 affords an excellent greaseless load sustaining bearing surface for the spherical ball head 26. Because of the comparative softness of the plastic material of bearing 30 with respect to the steel head 26 and the susceptibility of the plastic material to abrasion, the spherical surface of head 26 must be smooth and free from recesses into which the plastic bearing 30 could be extruded when subject to compressive force.

To the above end, the present invention provides an improved method of fabricating an integral ball head shaft which achieves the requisite smoothness and also results in a coupling 16 capable of maximum universal pivotal movement in a socket of the character described, both without recourse to grinding and polishing operations ordinarily required to complete such a structure. Referring to FIGURE 2, the shaft 22 is formed from a suitable length of malleable cylindrical bar stock which is mushroomed at one end, FIGURE 3, to form a rounded and preferably spherically created dome 26b having a flared annular base 26c. Also by either conjoint or successive operations, the rod or shaft 22 is enlarged at 21 below the base 26c to provide the coaxial downwardly converging conical body 21, the portion of the shaft 22 below the body 21, as well as the neck portion 22a between the enlargements 21 and 26c remaining undeformed at the initial diameter of the rod 22 of FIGURE 2. The lower end of rod or shaft 22 is thus available for threading at 23 in accordance with conventional practice.

Preferably in forming the enlargement 21, the shaft 22 is gripped above and below the region to be enlarged and is cold forged to the desired shape by compressional force and suitable die means well known to the art. Similarly, in forming the mushroomed end, the rod 22 is gripped in a die adjacent the end to be mushroomed, whereupon that end is cold forged to the symmetrical dome shape 26b, 26c coaxial with shaft 22, as illustrated, by downward pressure of a suitable die thereagainst. Thereafter by continued similar cold forging operations, the base 26c is deformed axially to effect a cylindrical sleeve 26d around the shaft 22 and spaced radially therefrom at 38. Simultaneously the spherical shape of the dome 26b is extended to approximately a semi-sphere merging tangentially with the cylindrical sleeve or base 26d. The sleeve 26d is then engaged from below and laterally and cold forged to the completed spherical shape coaxial with shaft 22, FIGURE 5, whereby the space 38 is reduced and may be completely enclosed.

By virtue of the construction described, the final forging seam 40 comprises an annular rounded lower edge of base 26d adjacent the shaft neck 22a and is thus located where it does not come into thrust bearing contact with the inner plastic bearing surface of the socket 28. Also as a consequence of forming the base 26c and then deforming it successively to the cylindrical and spherical configurations 26d, FIGURES 4 and 5, a rounded annular edge for the forging seam 40 is readily obtained as an inherent result of the forging operations. The rounded lower edge at the forging seam 40 avoids a reversely curved juncture between the final spherical surface of the ball head 26 and the neck 22a of shaft 22. Such a juncture comparable to the radius 42 at the juncture between the initially formed muchroom base 26c FIGURE 3, and rod 22 is commonly formed by other processes and must be removed by a separate operation in order to obtain maximum supporting contact between the under portions of the socket 28 and ball head 26.

The spherical ball head of FIGURE 5 is preferably rolled by conventional means to effect the final smooth spherical bearing surface required and is then forced into socket 28 through the latter's reduced lower opening 44. In this regard, the opening 44 is made as small as feasible to achieve maximum support by the material of the bearing member 30 for the underportion of ball head 26, i.e., the portion of ball head 26 proximate the shaft neck 22a.

Such support is required when the vehicle suspension of the type shown is under tension, as for example, during jounce when the vehicle is driven along a rough road. Where the material of member 30 lacks the resiliency to enable the ball head 26 to be forced through the small opening 44, the member 30 will be made in two halves, or may be partially slotted along its mid-plane, to enable assembly of the ball head 26 and bearing member 30. The assembly is then inserted into the snugly confining cup 32, whereupon plate 34 is secured in place.

Frequently in automobile wheel suspensions of the type disclosed, the extent of relative pivotal movement of the couplings 16 and 18 is at best insufficient, so that means are employed to increase the range of this movement. It has been common to reduce the diameter of the coupling shaft adjacent the ball head to increase the freedom of pivotal movement of the shaft with respect to the retainer for the ball head. In accordance with the above-described method of fabricating the ball head coupling, the initial rod 22, FIGURE 2, is selected having the desired small diameter of the neck 22a. During forging of the ball head 26 as described above, the rod 22 is also forged to form the conical bulge 21 at the region below neck 22a where the increased thickness is required. Thus the reduced neck 22a is achieved without undercutting the ball head 26.

Although the present invention has been described as being carried out by cold die forging operations, it will be apparent that other forming operations known to the art can be employed to fabricate the ball head coupling by the process described, as for example rolling or spinning. Preferably the ball head 26 is formed by a combination of forging steps, the base 26d of FIGURE 4 being suitably formed to the spherical shape of FIGURE 5 by spinning or rolling operations.

I claim:

1. A shaft having a ball end adapted to be pivotally confined in a greaseless socket of plastic material, said ball end and shaft being a unitary piece and having a spherical bearing surface coaxial with said shaft and defining one end thereof said spherical bearing surface having a base skirt portion contiguous therewith and spaced from and extending coaxially around said shaft and terminating in an annular rounded edge coaxial with and adjacent said shaft at the side of said ball end closest to said shaft, said bearing surface and its base portion cooperating to define a continuous outer spherical surface for said ball end, said outer spherical surface extending endwise from said annular rounded edge.

2. In the combination according to claim 1, said inner and outer surfaces of said base portion merge at said annular rounded edge.

3. In the combination according to claim 1, said annular rounded edge in any radial section along the axis of said shaft merging convexly with the spherical surface of said bearing surface base portion.

References Cited by the Examiner

UNITED STATES PATENTS

| | | | |
|---|---|---|---|
| 1,239,520 | 9/1917 | Reeves | 287—87 X |
| 2,141,753 | 12/1938 | Hufferd et al. | |
| 2,265,839 | 12/1941 | Hufferd et al. | |
| 2,768,848 | 10/1956 | Mitchell et al. | 287—87 |
| 3,023,038 | 2/1962 | White | 287—87 |
| 3,036,366 | 5/1962 | Ricks | 29—441 X |
| 3,036,367 | 5/1962 | Ricks | 29—441 X |

CARL W. TOMLIN, *Primary Examiner.*

A. V. KUNDRAT, *Assistant Examiner.*